C. WILLIAMSON.
SUBMARINE PLEASURE APPARATUS.
APPLICATION FILED DEC. 28, 1909. RENEWED JULY 3, 1911.
1,016,808.
Patented Feb. 6, 1912.
7 SHEETS—SHEET 3.
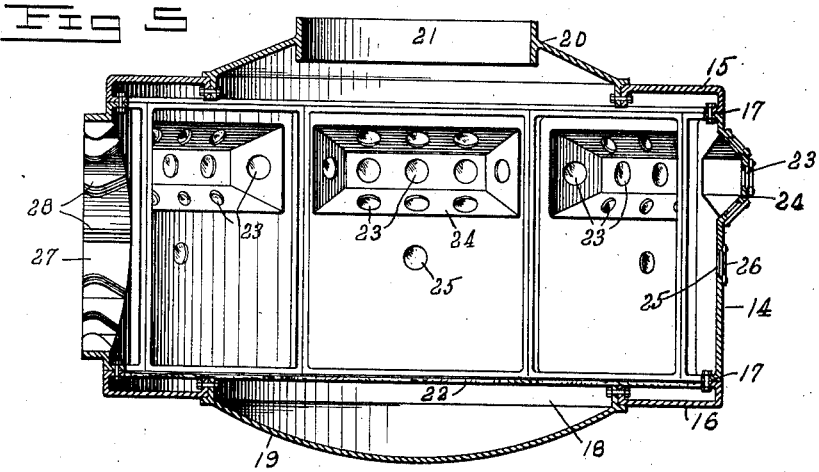
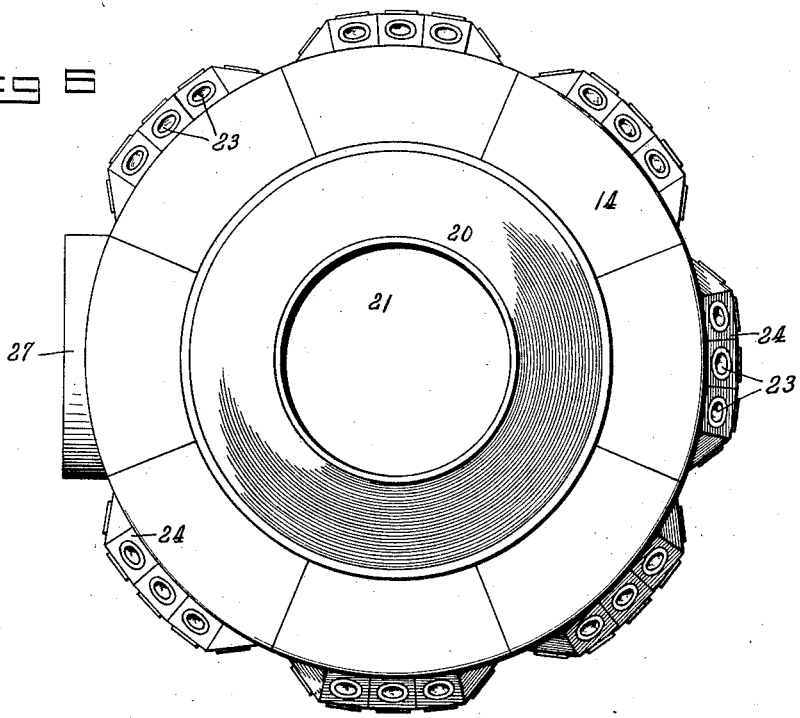

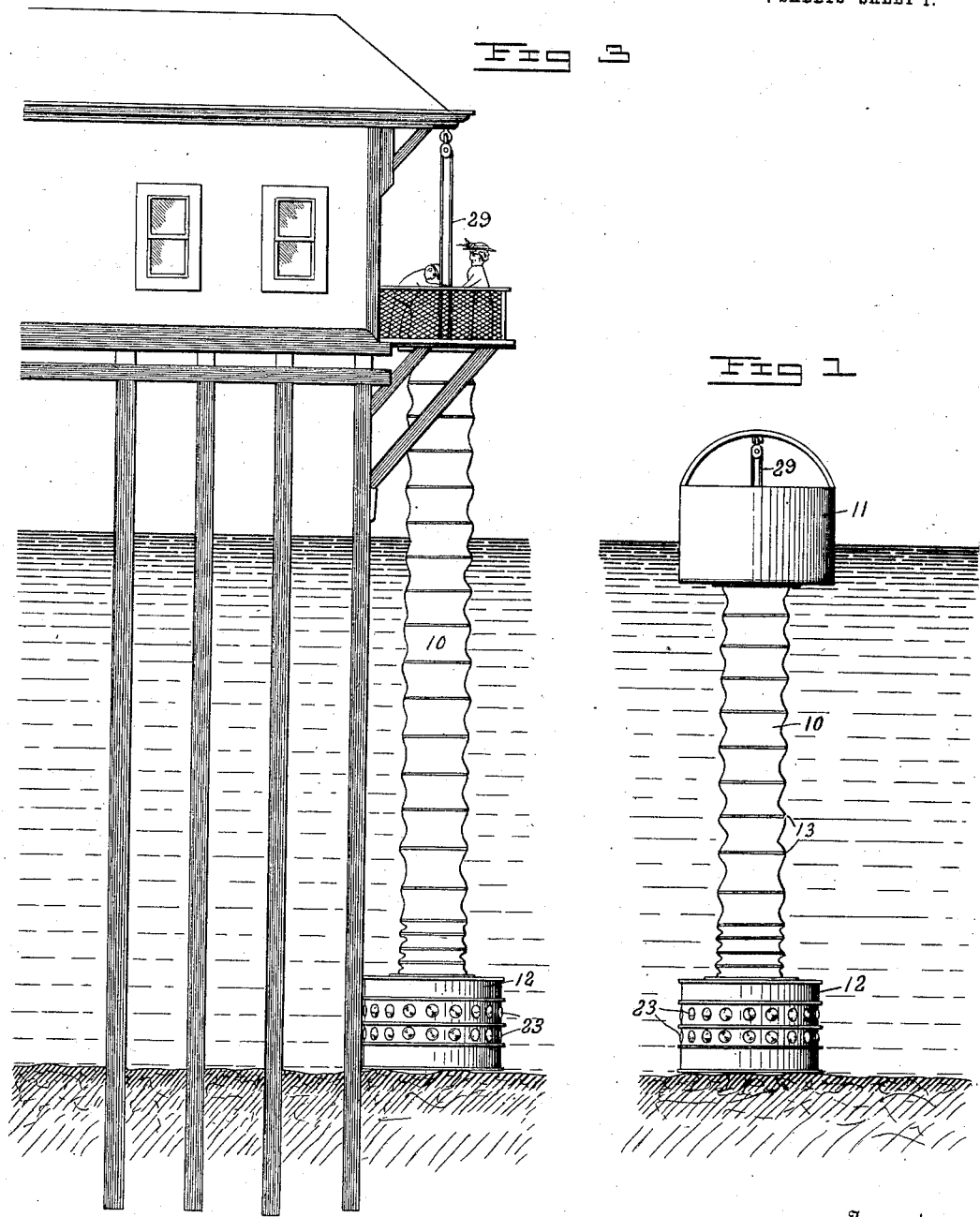

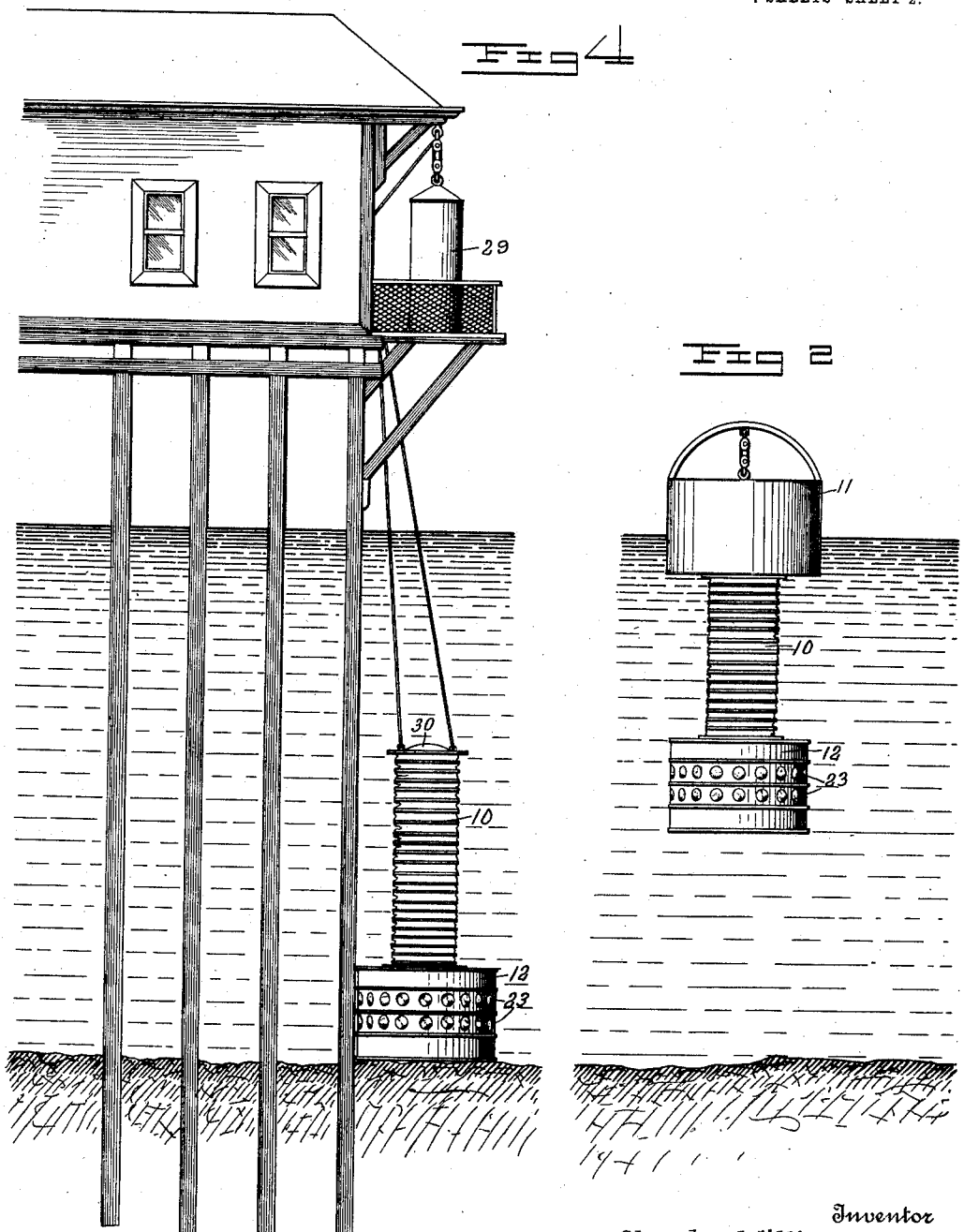

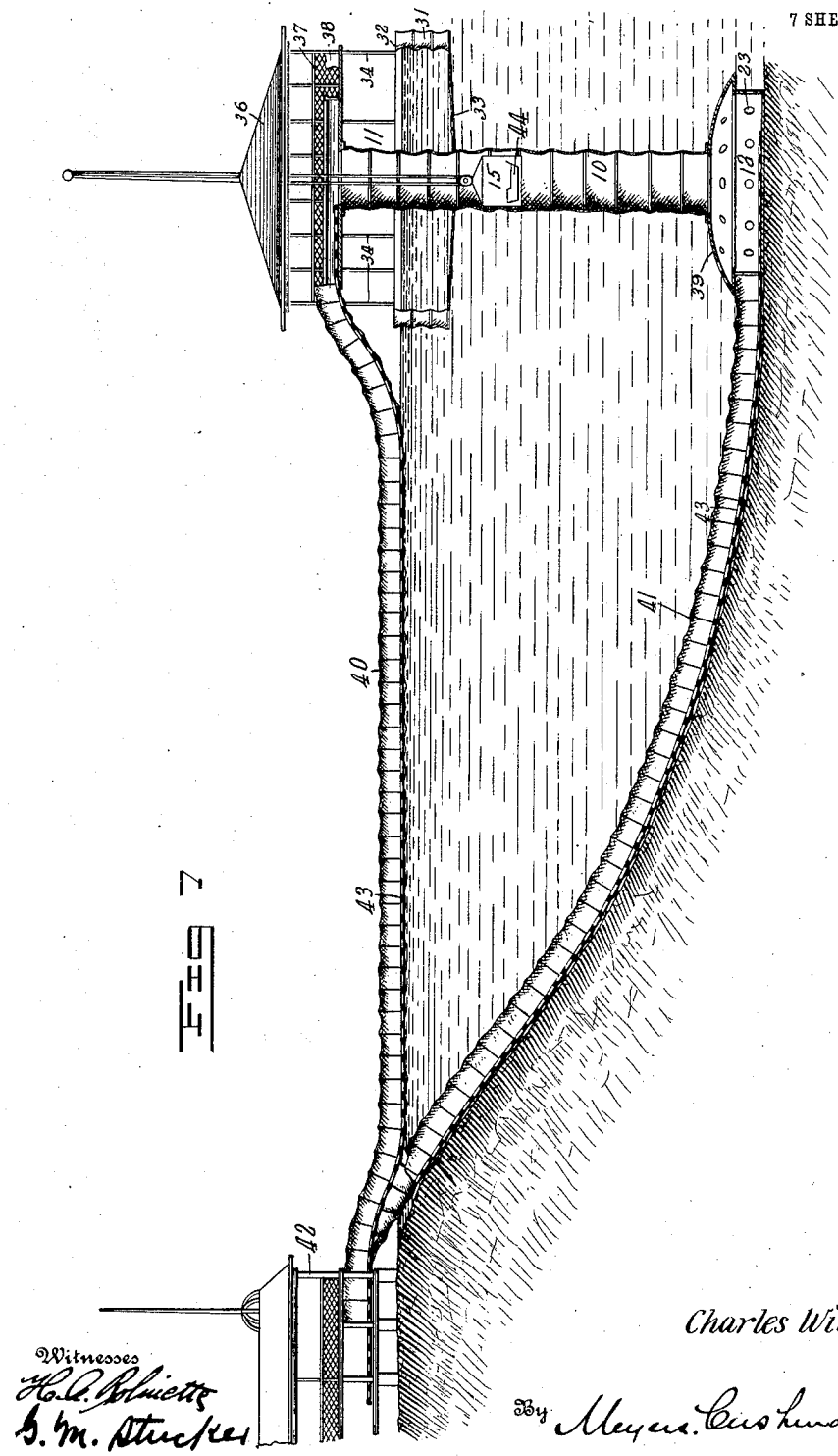

C. WILLIAMSON.
SUBMARINE PLEASURE APPARATUS.
APPLICATION FILED DEC. 28, 1909. RENEWED JULY 3, 1911.
1,016,808.
Patented Feb. 6, 1912.
7 SHEETS—SHEET 5.
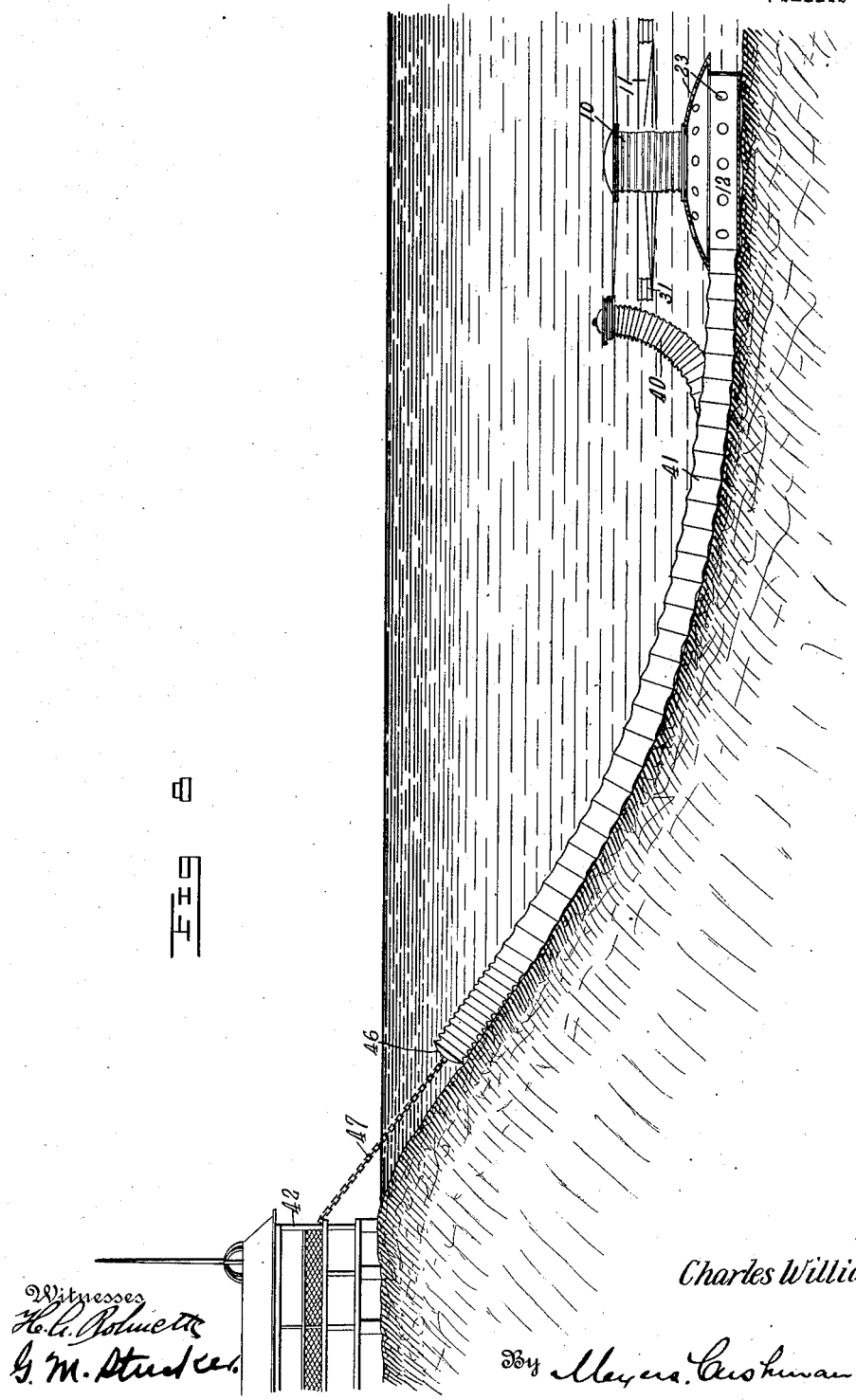
Inventor
Charles Williamson
Witnesses
By Meyers, Cushman & Rea
Attorneys

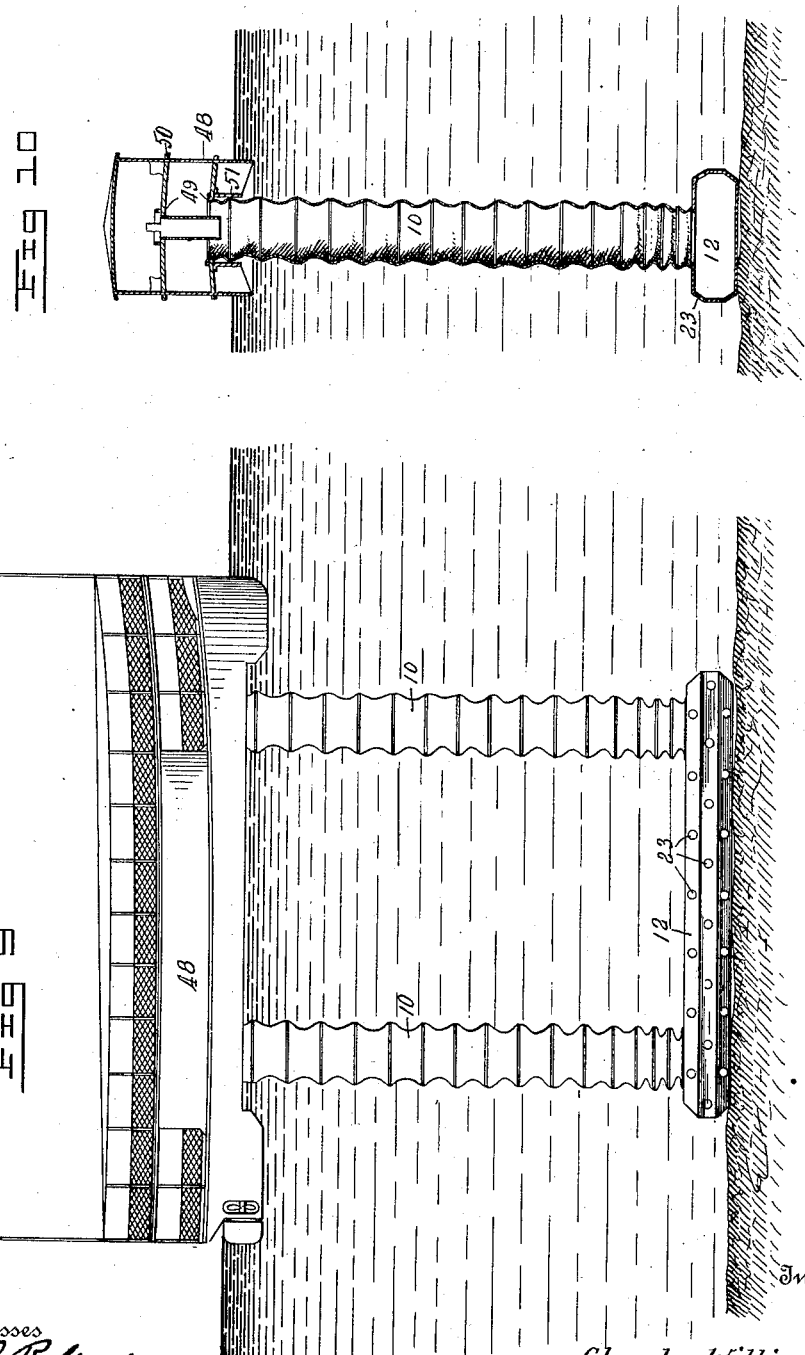

C. WILLIAMSON.
SUBMARINE PLEASURE APPARATUS.
APPLICATION FILED DEC. 28, 1909. RENEWED JULY 3, 1911.
1,016,808.
Patented Feb. 6, 1912.
7 SHEETS—SHEET 7.
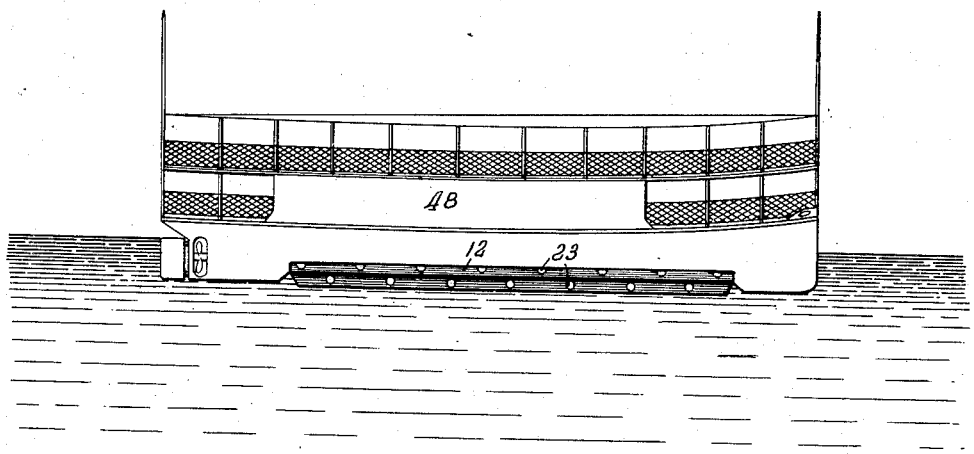
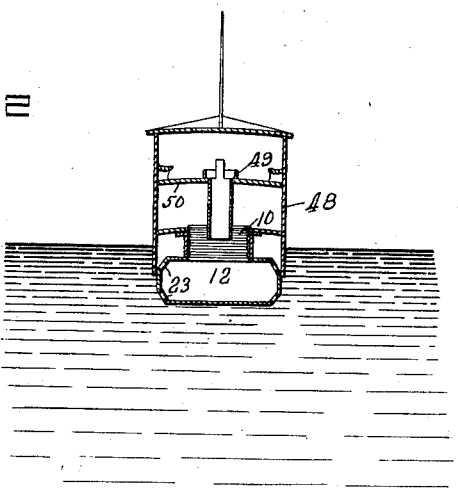

UNITED STATES PATENT OFFICE.

CHARLES WILLIAMSON, OF NORFOLK, VIRGINIA.

SUBMARINE PLEASURE APPARATUS.

1,016,808.     Specification of Letters Patent.     Patented Feb. 6, 1912.

Application filed December 28, 1909, Serial No. 535,314. Renewed July 3, 1911. Serial No. 636,912.

*To all whom it may concern:*

Be it known that I, CHARLES WILLIAMSON, a citizen of the United States, residing at Norfolk, in the county of Norfolk and State of Virginia, have invented new and useful Improvements in Submarine Pleasure Apparatus, of which the following is a specification.

The submarine pleasure apparatus of my invention consists of a submergible caisson at the bottom of which is provided a chamber of suitable dimensions equipped with observation windows placed at angles to the horizontal and vertical in such a manner that objects on the bottom and above the bottom of the body of water can be readily viewed through them. In its most highly developed form this pleasure apparatus is supported from a float at its upper end, and provided with means for entrance to and exit from the submarine chamber, this means taking the form of elevators and track-ways for transportation to suitably arranged openings, the track-ways, as well as the elevators being arranged in caissons communicating with the observation chamber, and in several embodiments of my invention forming a circuit of ways, such that persons may be transported from a given point down into the observation chamber beneath the water by a certain route and returned to the surface of the water and to the given point by another certain route, after having visited the observation chamber.

Numerous detailed, but attractive features of my invention, as well as the detail construction of the various elements thereof will be fully described in the specification following, in which are set forth the several embodiments of my invention, delineated in the accompanying drawings.

Of the drawings, Figures 1 and 2 are views of one embodiment of my invention showing the submergible caisson and observation chamber attached to a float; Figs. 3 and 4 are views corresponding to Figs. 1 and 2 showing my invention operated from the end of a pier; Figs. 5 and 6 are details of the observation chamber at the lower end of the caisson, Fig. 5 being a central section; Fig. 7 is a sectional elevation of my invention in one of its most highly developed forms, showing the submergible caisson and observation chamber attached to a float and provided with caisson passageways to the shore; Fig. 8 is a view of the same apparatus stored away beneath the surface of the water when not in use; Figs. 9 and 10 are longitudinal elevation and transverse section respectively of my invention applied to a boat, capable of moving under its own power or being towed from place to place; Figs. 11 and 12 are views similar to Figs. 9 and 10 and showing the boat ready to move from place to place.

10 is the main submergible caisson of my invention which is supported from a float structure 11 and provided at its lower end with an observation chamber 12. The caisson 10 is collapsible and flexible, being made up of a plurality of sections 13, preferably of a form previously patented by me and now well known (U. S. Letters Patent No. 745,469, Dec. 1, 1903). A caisson made flexible and collapsible, has freedom of both horizontal and vertical movement. In Figs. 1 and 2 I have shown float 11 and chamber which may also be made up of the same collapsible sections as shown in my patent just referred to. These sections 13 of the main caisson 10, I prefer to make of a weight substantially equal to the weight of the water displaced by them, so that they may be handled with ease from the float 11, and so that the float may be made of moderate size. The float 11 is made of a weight less than the water which it displaces so that the float has the necessary buoyancy to support itself, the caisson and chamber 12, and such other load as may be found desirable, provision being made always for a certain number of passengers. The sections of the chamber 12 are made greater in weight than the volume of the water displaced by them, and sufficiently greater to weight the bottom end of the caisson 10 and carry it to the bottom of the body of water in which the apparatus is used. In some instances I also make the sections 13 of the caisson 10 at its lower end heavier than those at the upper end in order to distribute the weight at the bottom of the caisson. The chamber 12 may in fact be made in direct continuation of the main caisson 10 and of the same diameter. As it is it amounts to an enlargement of the lower end of the caisson. But I prefer to make the chamber 12 non-collapsible and to make it of the form shown in Figs. 5 and 6, and to make it of cast iron or steel. As shown, clearly in Fig. 5, it consists of a circular main body 14 which may be in one piece or made in sections, as found most desirable, and end sections 15 and 16 attached to it by flanged connections 17 and provided with flanged openings 18 for attachment to a caisson at the bottom of the chamber. This opening is closed by a spherical head 19, while at the top of the chamber the opening is provided with a reducing flanged head 20 with a central opening 21 for attachment to caissons of reduced diameter. A flooring 22 is laid in the bottom of this chamber, and observation windows 23 are provided, some in a vertical plane, and others above and below the vertical windows in planes at an angle to the vertical. This enables one to look out horizontally and down toward the bottom of the body of water and also up toward the surface of the water. Preferably an offset 24 is made in the body casting 14, as shown in Fig. 5 for the accommodation of these windows, and the windows at an angle to the vertical are placed at substantially 45° to the vertical. As many of these windows are provided as may be found desirable, and at a height above the floor convenient for observers. If the body 14 is made in sections, as shown, a plurality of offsets 24 are provided. Also in the walls of the observation chamber are openings 25 normally closed by plates 26, which plates may be windows of the same form as the windows 23. These openings 25 however, may be used for the attachment of flexible arms, as shown in my prior patent above noted. Objects may be thus grasped by inserting an arm into the mitten and held up before an observation window where they can be seen and examined. One or more larger openings 27 equipped with reducing and attaching flanges 28 are also provided in the side walls of the chamber for a purpose which will presently appear. As thus organized my apparatus may be used for a number of purposes. In use as a pleasure apparatus an elevator indicated at 29 is provided for carrying passengers to and from the chamber 12. These passengers may examine the bottom of the body of water in which the caisson is submerged, examining the entire bottom as the caisson is moved from place to place.

That this apparatus has great value for use in submarine mining or the gathering of submarine products of any sort is evident, but used as a pleasure apparatus it is a source of much interest and pleasure to those who patronize it.

This apparatus is intended to be used either floating from point to point or anchored to the bottom at a single point. In floating from point to point more or less of the sections 13 are collapsed, the chamber 12 being raised and lowered according to the depth desired. When anchored at a single point, the caisson 10 is lowered until the chamber 12 rests upon the bottom and a suitable number of sections 13 rest upon its top to anchor it securely. Fig. 1 shows the apparatus so anchored, while Fig. 2 shows the apparatus with the caisson drawn up, the top sections 13 being collapsed, and the apparatus being *en route* from one point to another.

Figs. 3 and 4 show the same apparatus supported from the end of a pier instead of from the float 11. In this case I close the top of the caisson 10 with a head 30 and lower it below the surface of the water when not in use, allowing the entire weight of the apparatus to rest upon the bottom.

In Figs. 7 and 8 I have shown an embodiment of my device in its most highly developed form. As in Figs. 1 to 4 just described 10, 11 and 12 indicate the main caisson, the float and the observation chamber respectively. The float 11 in this embodiment however, is much enlarged. It is made of double flexible sections 31, circular in form, concentric with each other, but one smaller in diameter than the other. The space between these sections 31 is inclosed by heads 32, and the float thus made buoyant. The open bottom of the float is closed by a perforate structure 33, the caisson 10 passing centrally through this structure. The structure being perforate, a pool of water, always changing through the perforate structure 33 is confined within the float. Bathers may use this pool without danger of drowning, the openings in the structure 33 being made quite small, or else suitably guarded. Stanchions 34 rising from the upper part of the float support an upper or observation deck, and a canopy roof 36, thus forming an open air pavilion. The main caisson runs up and is attached to this upper deck, which is guarded by a rail 37 and equipped with suitable seats 38 for the accommodation of onlookers. The elevator 15 is supported from the roof 36. The observation chamber 12 differs principally in the fact that it is made larger and provided with a bell-shaped top 39. This apparatus is anchored near the shore and caissons, preferably, though not necessarily, of the same type as the main caisson 10, communicate with the float and with the observation chamber from the shore. These caissons are indicated at 40 and 41. The caisson 40 is made up of sections weighing slightly less than the water they displace, and hence floats on the surface of the water. I may submerge this caisson to any desired extent by simply varying its weight. At one end it communicates with a building 42 on the shore, while at the other end it communicates with the upper deck 35 of the float. From the upper deck of the float the caisson is inclined downwardly to the surface of the water. The other caisson 41 I make somewhat heavier than the water which it displaces, thus causing it to sink to the bottom and rest there. At one end it also communicates with the building 42 on the shore, while at the other end it communicates with the observation chamber 12, being attached to said chamber by the flange 28 or opening 27, (see Fig. 5), the function of this opening now being apparent. Tracks 43 on which run cars 44 are laid the length of the caissons 40 and 41 from the building 42 on the shore to the upper deck of the float, and to the observation chamber, respectively. Observers are carried down the caisson 41 by cars 44 and after viewing the bottom of the ocean or other body of water through the windows 23 are carried up by the elevator 15 to the upper deck 35 of the float from whence the cars 44, also carried up by the elevator, may run back through the caisson 40 to the building 42, thus carrying the passenger by a circuit of ways down under a body of water up to its surface and back along the surface through the caisson to the starting point. The car may be run along caisson 40 by gravity alone being impelled while on the incline from the upper deck, or else suitable propelling means may be used on the car. It is, of course, obvious, that this circuit may be made from opposite directions, starting from the building 42 and first running through caisson 40. It is also obvious that the cars 44 may be confined to the respective caissons 40 and 41, the cars running back and forth in the caissons, and the elevator 15 being used to carry passengers only. Observers may occupy the seats 37 and watch the bathers in the pool below them and the sightseers going up and down the caisson 10. This development of my invention is particularly adapted for use as a pleasure apparatus. It is particularly adapted for use on shores of the bays, and rivers, and on the shore of the ocean. When used on the shore of the ocean suitable provision should be made to prevent the caissons 40 and 41 leading from the shore from being damaged by washing of the waves on the shore. To this end I may completely submerge the caisson 40 and cause it as well as the caisson 41, to pass beneath the waves and beneath the surface of the beach entering the building beyond the water line. The caissons being flexible and collapsible adapt themselves to the rolls of the water and the float 11 may rise and fall without hindrance from the caisson 10. When not in use the apparatus of this embodiment of my invention may be stored beneath the surface of the water, as shown in Fig. 8. The caissons 10, 40 and 41 are all collapsed until they sink to the bottom, the caissons 40 and 41 being closed with heads 46 and secured by chains 47 to the shore, while at their other ends they are secured respectively to the observation chamber 12 and to the float 11, which is also collapsible with caisson 10.

In Figs. 9 to 12, I show still another embodiment of my invention in the form of an observation chamber and caisson supported from a boat 48. The observation chamber 12 in this instance is made very long, substantially as long as the boat 48, and two caissons 10 communicate with it leading down through suitable openings 49 in the bottom of the boat from the upper deck 50. Figs. 9 and 10 show the observation chamber resting on the bottom, while Figs. 11 and 12 show the chamber drawn up with the caissons 10 to the bottom of the boat which is shaped, as shown, at 51, to accommodate the chamber 12. With the chamber so drawn up the boat may be propelled under her own power or towed to any desired point. As shown, the boat is provided with her own power. This embodiment may be used either as a pleasure apparatus for the transportation of passengers, or as a commercial apparatus for this and other uses. As before, suitable hoisting and lifting devices are provided.

That my device is useful, attractive and efficient is apparent. It is capable of other uses than those which I have mentioned, the particular embodiments which I have described being particularly designed for the purpose set forth. Modifications in structure may be desirable to adapt my apparatus to other uses and to other conditions of service, and these may be made, as well as modifications in the structure described for the same service, without departing from the generic spirit of my invention. I desire to cover all such modifications in the annexed claims.

What I claim is:

1. A submarine pleasure apparatus comprising a submergible chamber having observation windows in its walls some at an angle to the vertical and others adjacent to them in vertical planes.

2. A submarine pleasure apparatus comprising a submergible chamber having windows in its walls some at 45° to the vertical and others adjacent to them in vertical planes.

3. A submarine pleasure apparatus comprising a submergible chamber, offsets in the walls of said chamber, and windows in said offsets the walls of which are arranged in part vertically and in part at an angle to the vertical.

4. A submarine pleasure apparatus comprising a submergible caisson, means for supporting said caisson, and means for closing the upper end of the caisson water-tight when it is desired to suspend use of it.

5. A submarine pleasure apparatus comprising a double-decked float, a submergible observation chamber, and a passage-way connecting said chamber with said float which leads to the upper deck of said float.

6. A submarine pleasure apparatus comprising a double-decked float, a submergible observation chamber, and a caisson connecting said observation chamber with the upper deck of said float.

7. A submarine pleasure apparatus comprising a float, which incloses a pool of water, and a perforate bottom structure forming a bottom for said pool, and a submergible caisson supported from said float and extending through said structure and through said pool.

8. A submarine pleasure apparatus comprising a submerged chamber, and ways spaced apart and leading thereto which form a circuit from a given point.

9. A submarine pleasure apparatus comprising a submerged chamber, ways leading thereto which form a circuit from a given point, and means of transportation on said ways.

10. A submarine pleasure apparatus comprising a pair of submerged caissons connected together at their lower ends by an observation chamber, and ways leading from said caissons and forming with them a circuit from a given point.

11. In combination a submerged observation chamber adjacent a shore, a passageway from the shore to said chamber, a second passage-way from the chamber to the surface of the water, and a third passageway leading from the second passage-way to the shore.

12. In a submarine pleasure apparatus, a submerged chamber, two separate passage-ways from said chamber to the surface of the water, and a third passage-way connecting said two passage-ways.

13. In a submarine pleasure apparatus, a submerged observation chamber, two separate caissons spaced apart and each leading from the surface of the water to said observation chamber, and a third passage-way connecting the surface ends of said two caissons.

14. In a submarine pleasure apparatus, a movable observation chamber which rests adjacent the bottom of a body of water, and a submarine passage-way connecting said observation chamber with the shore.

15. In a submarine pleasure apparatus, a floated caisson adjacent the shore of a body of water, and a submarine passage-way from the lower end of said caisson to the shore.

16. In a submarine pleasure apparatus, a floated caisson adjacent the shore of a body of water, a submarine passage-way from the lower end of said caisson to the shore, and a second passage-way from the upper end of said caisson to the shore.

17. In a submarine pleasure apparatus, a float adjacent a shore, a submergible caisson supported therefrom, a passage-way from the float to the shore, and a submarine passage-way from the caisson to the shore.

18. In a submarine pleasure apparatus, a float adjacent a shore, a submergible caisson supported therefrom, a passage-way from the float to the shore, and a submarine passage-way from the caisson to the shore, said passages terminating at a common point on the shore.

19. In a submarine pleasure apparatus, a float adjacent a shore, a submergible caisson supported therefrom, a passage-way from the float to the shore, a submarine passage-way from the caisson to the shore, said passages terminating at a common point on the shore, and a housing at said terminus.

20. In a submarine pleasure apparatus, a float adjacent a shore, a submergible caisson, said caisson being supported from said float, an observation chamber at the bottom of said caisson, a passage-way from said float to the shore, a submarine passage-way from said observation chamber to the shore.

21. In a submarine pleasure apparatus, a caisson adjacent a shore, a passage-way from the bottom of said caisson to the shore, and a passage-way from the top of said caisson to the shore.

22. In a submarine pleasure apparatus, a caisson adjacent a shore, a passage-way from the bottom of said caisson to the shore, and a passage-way from the top of said caisson to the shore, said passages terminating at a common point on the shore.

23. In a submarine pleasure apparatus, a caisson adjacent a shore, a passage-way from the bottom of said caisson to the shore, a passage-way from the top of said caisson to the shore, said passages terminating at a common point on the shore, and a housing at said common terminus.

24. In a submarine pleasure apparatus, a caisson adjacent a shore, an observation deck at the top of said caisson above the surface of the water, an observation chamber at the bottom of said caisson below the surface of the water, a passage-way leading from said deck to the shore, and a passage-way leading from said chamber to the shore.

25. In a submarine pleasure apparatus, a submerged observation chamber adjacent a shore, and an inclined passage-way from the shore to said chamber.

26. In a submarine pleasure apparatus, a submerged observation chamber adjacent a shore, an inclined passage-way from the shore to said chamber, and means of transportation along said passageway.

27. In a submarine pleasure apparatus, a caisson adjacent a shore, and a passage-way leading from the shore on and along the surface of the water to said caisson.

28. In a submarine pleasure apparatus, a caisson adjacent a shore, a floating supporting structure associated with the upper end of said caisson, and a passage-way leading from said supporting structure to the shore, one end of said passageway being elevated above the other.

29. In a submarine pleasure apparatus, a caisson adjacent a shore, a pavilion deck associated with the upper end of said caisson, and a passage-way from said observation deck to the shore, the end of said passage-way at said observation deck being elevated above the other.

30. In a submarine pleasure apparatus, in combination, two submerged caissons, and a way connecting them which extends from one to the other on and along the surface of the water.

31. In a submarine pleasure apparatus, in combination, two separated submerged caissons, an observation chamber connecting their lower ends, and a way connecting their upper ends.

32. In a submarine pleasure apparatus, a submergible caisson, a bathing pool associated with the upper end of said caisson, and an observation chamber associated with its bottom.

33. In a submarine pleasure apparatus, a hollow float, a pool within the body of said float, and a submergible caisson which passes through said pool and is secured to said float.

34. In a submarine pleasure apparatus, a hollow circular collapsible float, a pool in the center of the body of said float, a submergible caisson which passes centrally through said pool and is secured to said float.

35. In a submarine pleasure apparatus, in combination, a float, a caisson supported from said float, and a pool in the body of said float, a lower deck from which access is had from said pool, and an upper deck from which access is had to said caisson.

In testimony whereof I have hereunto set my hand in presence of two subscribing witnesses.

CHARLES WILLIAMSON.

Witnesses:
J. F. DRUMMOND,
J. S. OAKES.

---

Copies of this patent may be obtained for five cents each, by addressing the "Commissioner of Patents, Washington, D. C."